May 10, 1960  W. C. RIESTER  2,936,203
PISTON RING
Filed June 19, 1957

INVENTOR.
WILLIAM C. RIESTER
BY
Bean Brooks Buckley & Bean
ATTORNEYS

United States Patent Office 2,936,203
Patented May 10, 1960

2,936,203

PISTON RING

William C. Riester, Buffalo, N.Y., assignor to Trico Products Corporation, Buffalo, N.Y.

Application June 19, 1957, Serial No. 666,524

6 Claims. (Cl. 309—23)

This invention relates to piston rings, and more particularly to a piston ring for use in a hydraulic pump arrangement.

In the application of piston rings to pumps, it is desirable to obtain equal contact pressure between the ring and cylinder surface about the entire periphery of the ring. Unequal contact pressure results in accelerated ring wear, loss of fluid tight sealing, and other factors contributing to reduced overall operating effectiveness. Misalignment of the piston axis and the axis of the cylinder, as well as piston out-of-roundness, can contribute substantially to the difficulty of attaining uniform contact pressure about the periphery of the ring.

The present invention provides a solution to the problem of maintaining uniform pressure distribution about a piston ring periphery, and is admirably suited for application where it may be difficult to maintain alignment of the piston axis and the axis of the cylinder.

The main object of this invention is to provide an improved piston ring which will automatically maintain uniform pressure about its periphery as it is held in sliding engagement upon the inner wall of a cylinder.

A further object of this invention is to provide a piston ring that will automatically maintain uniform contact pressure about its periphery in spite of misalignment between the piston and the axis of the cylinder.

These and further objects and features of the invention will become more apparent from the following description and the accompanying drawing wherein.

Figure 1:
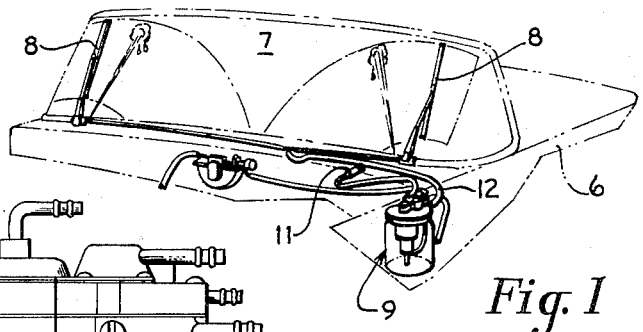
Fig. 1 is a fragmentary perspective view of a motor vehicle having a windshield washer assembly incorporating a piston parking arrangement representing an embodiment of the invention.
Figure 2:
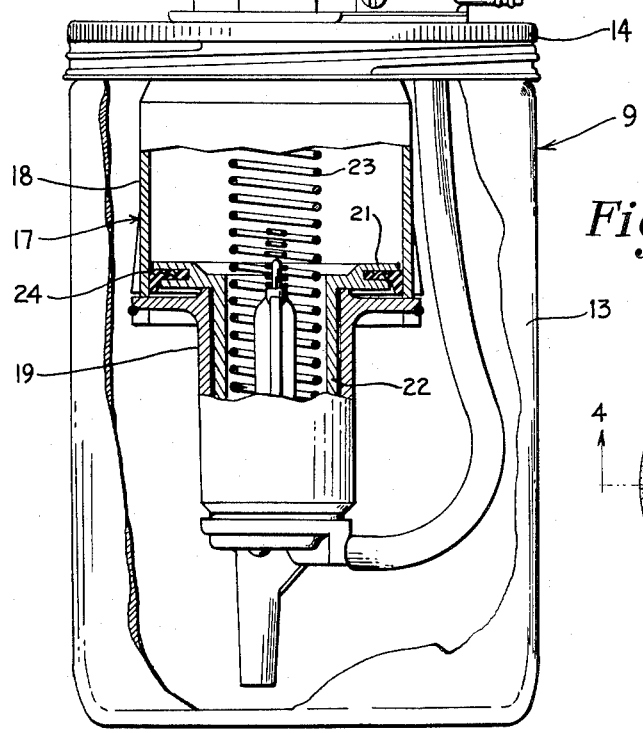
Fig. 2 is an enlarged view, partly in section, of a washer reservoir and pump assembly used in the arrangement of Fig. 1.
Figure 3:
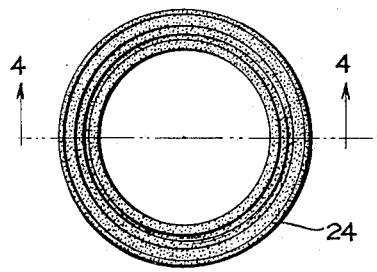
Fig. 3 is a plan view of a piston ring used in the pump shown in Fig. 2.

While the piston ring of the present invention may find suitable application in many types of pumps, for the sake of illustration it is disclosed as applied to a pump used in a windshield washer system. As seen in Fig. 1, a motor vehicle 6, has a windshield 7 upon which are a pair of wiper blade assemblies 8 arranged for reciprocating movement to provide an arcuate wiping pattern, and a windshield cleaner system comprising a reservoir assembly 9, associated control means 11, and water carrying conduits 12, all of which are well known to those skilled in the art. The reservoir assembly comprises a jar or container 13, for holding a supply of windshield cleaning liquid, a cap 14, a coordinator mechanism 16 mounted on top of the cap, and a pump assembly 17 affixed to the bottom of the cap. The coordinator mechanism is adapted for the coordination of pump operation with wiper blade movement to effect a windshield cleaning operation.

The pump assembly 17 includes an enlarged cylinder 18, and a cylinder 19 of less diameter which is affixed to the bottom of cylinder 18. Reciprocally arranged in said cylinders is a piston having a head 21 positioned within the cylinder 18, and a piston rod 22 slidably arranged in the cylinder 19. By means of a pressure differential preferably created by the use of a vacuum, the piston will be caused to move upwardly in the cylinder 18 to draw a charge of cleaning liquid into the lower end of the cylinder 19; upon removal of the pressure differential, the compression spring 23 will expand and the piston will be forced downwardly to expel the cleaning liquid from the cylinder 19, which cleaning liquid will be directed upon the vehicle windshield.

The axis of cylinder 19 and the axis of cylinder 18 may not be in alignment, and there may be a further lack of alignment between the axis of the piston rod 22 and the axis of the piston head 21. Consequently, it may be difficult to arrange a piston ring which will be maintained with uniform contact pressure against the wall of the cylinder upon which it slides.

Figure 4:
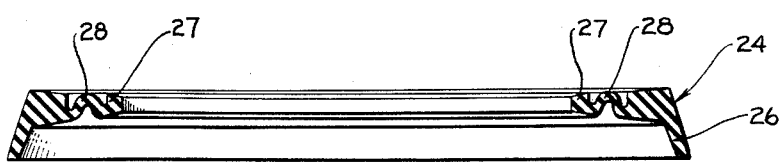
Fig. 4 is a section view, enlarged, as seen from line 4—4 in Fig. 3.

The piston ring of the present invention solves such problem in a simple and effective manner. As best seen in Fig. 4, a piston ring 24 of the invention comprises a flexible material, preferably made of molded rubber, having an outer circular lip portion 26 and an inner circular center portion 27. Integrally arranged between the lip portion 26 and the center portion 27 is a folded, or corrugated, central web section 28 which provides a certain degree of lateral movement between the lip portion and the center portion. As a result, the ring 24 when applied to the piston head 21 will automatically allow slight misalignment of the piston head axis relative to the axis of the cylinder 18 without destroying the sealing effect of the lip portion 26, as it is moved upon the surface of the cylinder 18. In other words, the contact pressure between the ring and the wall of the cylinder 18, which is established when the piston is inserted in the cylinder 18, will not be changed by any slight amount of misalignment or shifting of the piston head laterally within the cylinder 18.

It will be seen that the piston ring according to the invention will automatically provide uniform contact pressure about its periphery as it is held in sliding engagement upon the inner wall of the cylinder, and will maintain such uniform pressure in spite of lack of concentricity between the piston axis and the axis of the cylinder.

The foregoing description has been given in detail without thought of limitation since the inventive principles involved are capable of assuming other physical embodiments without departing from the spirit of the invention and the scope of the appended claims.

What is claimed is:

1. A piston ring formed of a molded flexible material and comprising an inner circular center portion adapted to be yieldably mounted in a slot in a piston, an outer circular lip portion arranged for slidable sealing engagement with the walls of a cylinder, and a corrugated web portion connecting the center portion and the lip portion, said web portion allowing adjustment of the contour of said center portion to said piston and permitting a shifting of the center portion relative to the piston and to the lip portion during relative movement between the piston and cylinder without destroying the slidable sealing engagement between the lip portion and the cylinder wall.

2. A piston ring comprising an outer annular relatively rigid resilient portion having an outer edge adapted to contact the wall of a cylinder, an inner annular relatively flexible resilient portion adapted to be yieldable positioned within a slot in a piston, and a central flexible portion joining said inner and outer annular portions, said flexible portion permitting said inner portion to maintain good sealing contact with said piston and for permitting said outer portion to maintain good sealing contact with said cylinder wall notwithstanding irregularities of configuration of said piston or cylinder or changes of alignment between said piston and said cylinder.

3. A piston ring construction for providing a seal between a piston and a cylinder comprising an outer annular portion of relatively large cross section, an inner annular portion of relatively small cross section adapted to be yieldably mounted on a piston, and a flexible intermediate portion of less thickness than said annular portions joining said inner and outer portions for permitting said inner and outer portions to move relative to each other without impairing the sealing relationship between said piston and cylinder.

4. A piston ring construction comprising an outer resilient portion of relatively large cross section adapted to move relative to a cylinder wall, an inner resilient portion of relatively small cross section adapted to be yieldably mounted in a slot in a piston which is axially movable relative to said cylinder wall, and a flexible portion joining said outer and inner portions whereby said inner portion may conform to the contour of said piston to prevent leakage between said piston and said inner portion without deleteriously stressing said outer annular portion thereby preventing leakage between said cylinder wall and said outer portion and whereby said outer portion may flex to adjust to variations in shape of said cylinder wall to prevent leakage between said outer portion and cylinder wall without deleteriously stressing said inner portion thereby preventing leakage between said piston and said inner portion, and whereby said flexible portion absorbs the stresses on said inner and outer portions due to relative movement therebetween incident to changes in alignment between said piston and cylinder during relative movement therebetween, said yieldable mounting between said inner portion and said piston enhancing the sealing action of said piston ring.

5. A piston sealing element comprising a relatively inflexible outer portion having an edge adapted to provide a seal with the inner surface of a cylinder member, a relatively flexible inner portion adapted to be mounted against substantial movement on a piston member and adapted to conform to the configuration of said piston member which is adapted to move relative to said cylinder member, and a flexible central portion joining said relatively inflexible outer portion and said relatively flexible inner portion, whereby the flexing of said flexible central portion permits both said inner and outer portions to conform to surface irregularities of the respective members with which they are in contact without disrupting the sealing engagement either between the member to which the sealing element is conforming or to the other of the members and also permits variations in stresses on said sealing element during relative movement between said piston and cylinder members without impairing the sealing relationship between said cylinder member and said piston member.

6. A piston sealing arrangement comprising a piston sealing element having a first portion adapted to be placed in sealing contact with a cylinder along which it is axially movable, a second portion which is more flexible than said first portion adapted to be yieldably placed in contact with a piston which is movable relative to said cylinder, said second portion being mounted for freedom in a radial direction but against substantial axial movement on said piston, and a flexible portion connecting said first and second portions whereby said flexible portion permits said second portion to conform to irregularities of the configuration of said piston and also absorbs stresses due to changes in alignment between said piston and cylinder thereby preventing the impairing of the sealing relationship between said piston and cylinder during relative movement therebetween.

References Cited in the file of this patent

UNITED STATES PATENTS

| | | |
|---|---|---|
| 2,077,906 | Stevens | Apr. 20, 1937 |
| 2,684,262 | Neesen | July 20, 1954 |
| 2,684,632 | Horton | July 27, 1954 |
| 2,743,947 | Foss | May 1, 1956 |
| 2,757,994 | Snyder | Aug. 7, 1956 |
| 2,815,994 | Lippman et al. | Dec. 10, 1957 |